Feb. 28, 1933.　　　M. B. REACH　　　1,899,825
GOLF BAG
Filed April 24, 1931　　　5 Sheets-Sheet 1
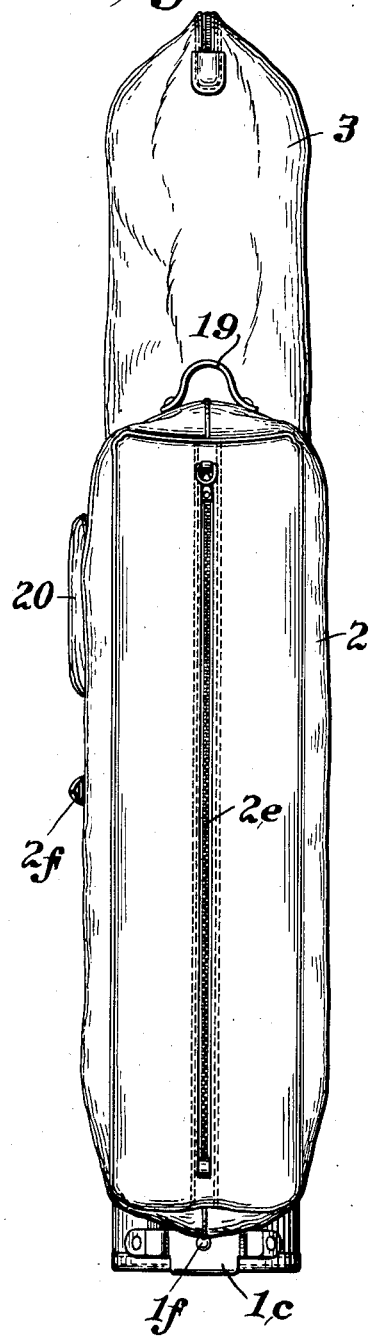
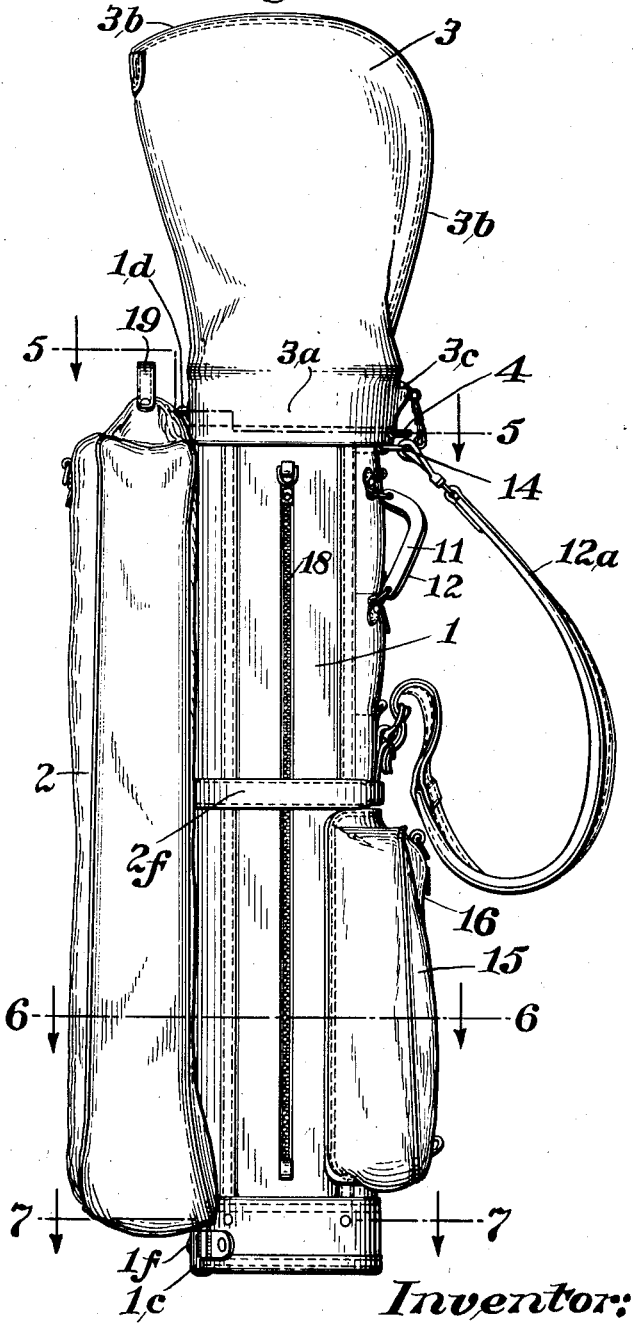
Inventor:
Milton B. Reach,
By Spear, Donaldson + Hall
Attys.

Feb. 28, 1933. M. B. REACH 1,899,825
GOLF BAG
Filed April 24, 1931  5 Sheets-Sheet 2
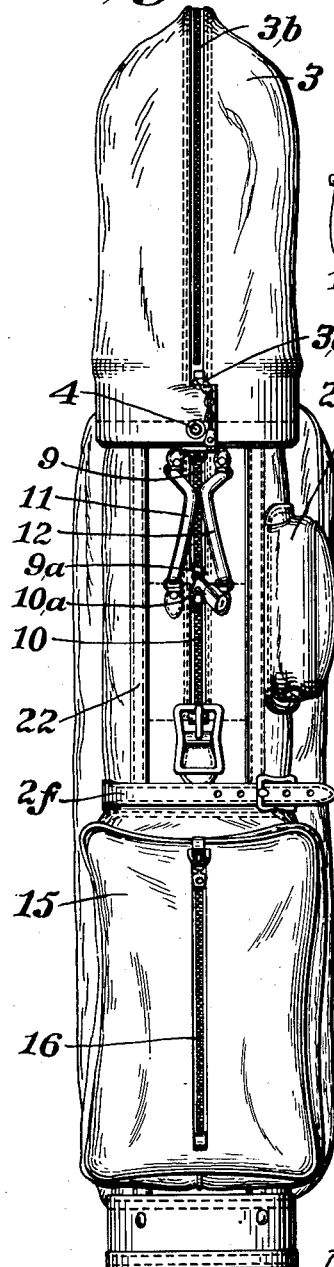
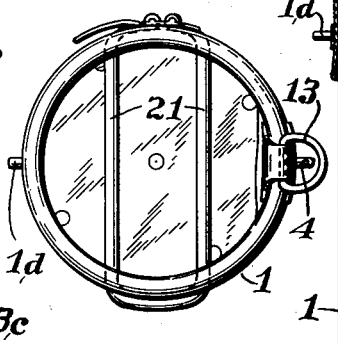
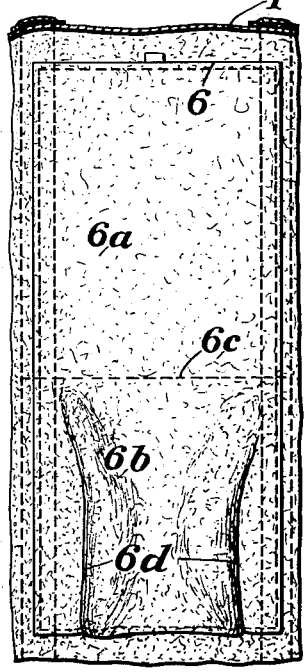
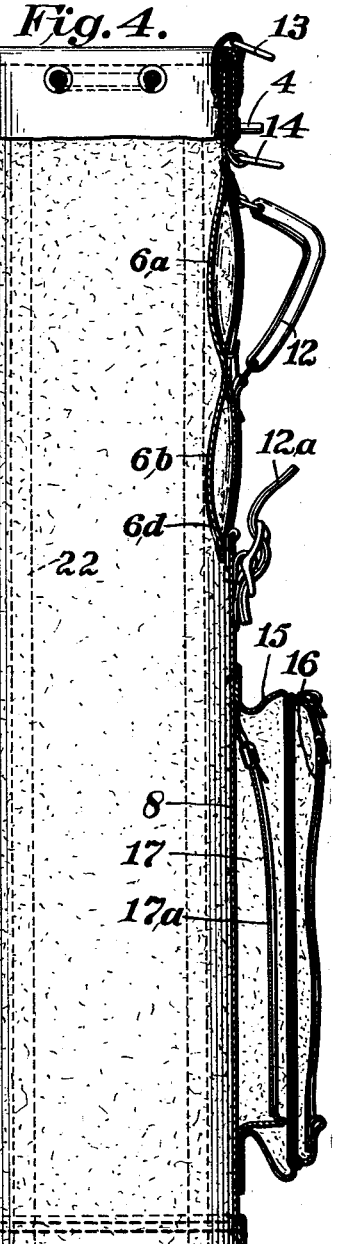
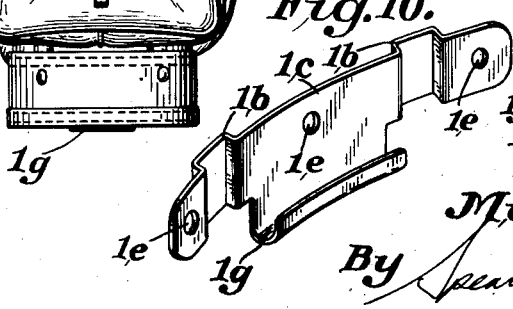
Inventor:
Milton B. Reach,
By Spear, Donaldson + Hall
Attys.

Feb. 28, 1933.  M. B. REACH  1,899,825
GOLF BAG
Filed April 24, 1931   5 Sheets-Sheet 3
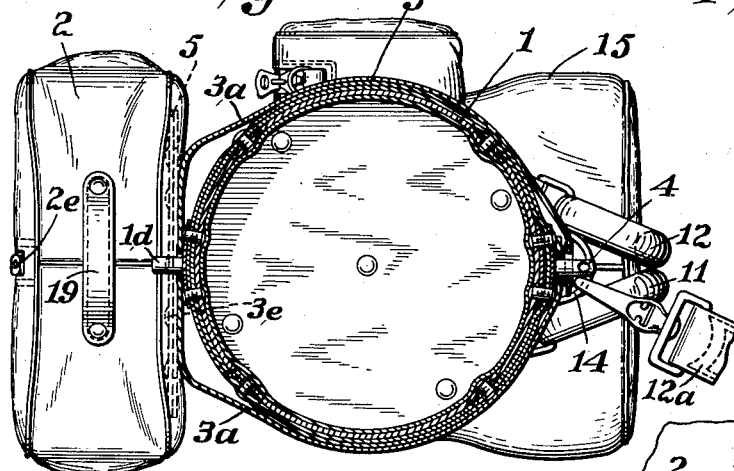
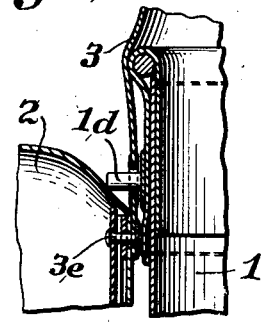
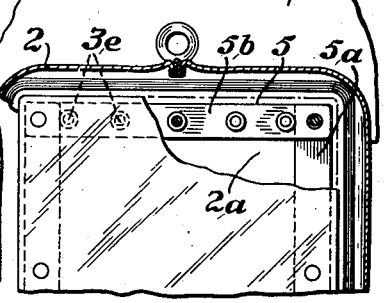
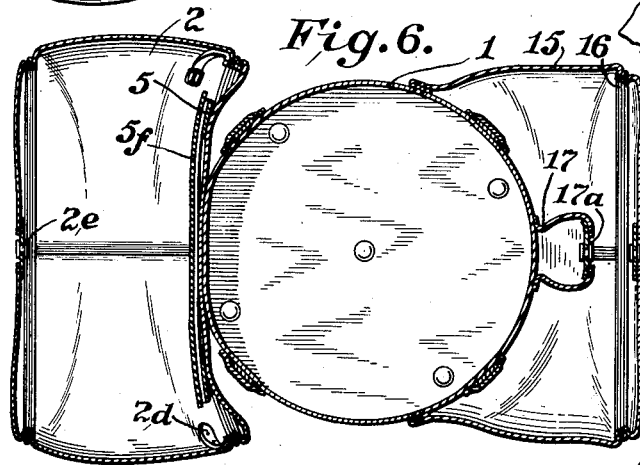
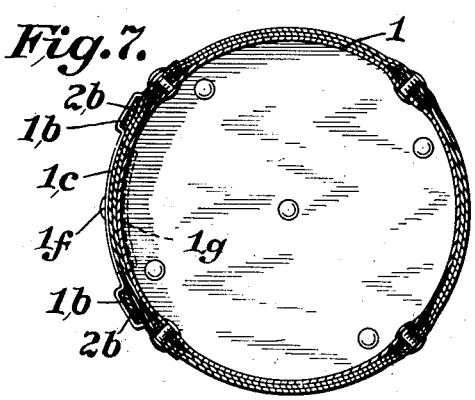
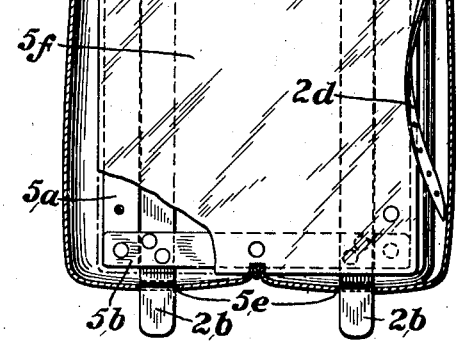
Inventor:
Milton B. Reach,
By Spear, Donaldson & Hall
Attys.

Feb. 28, 1933. M. B. REACH 1,899,825
GOLF BAG
Filed April 24, 1931 5 Sheets-Sheet 4

Inventor:
Milton B. Reach,
By Spear, Donaldson + Hall
Attys.

Feb. 28, 1933. M. B. REACH 1,899,825
GOLF BAG
Filed April 24, 1931 5 Sheets-Sheet 5
Fig.12.
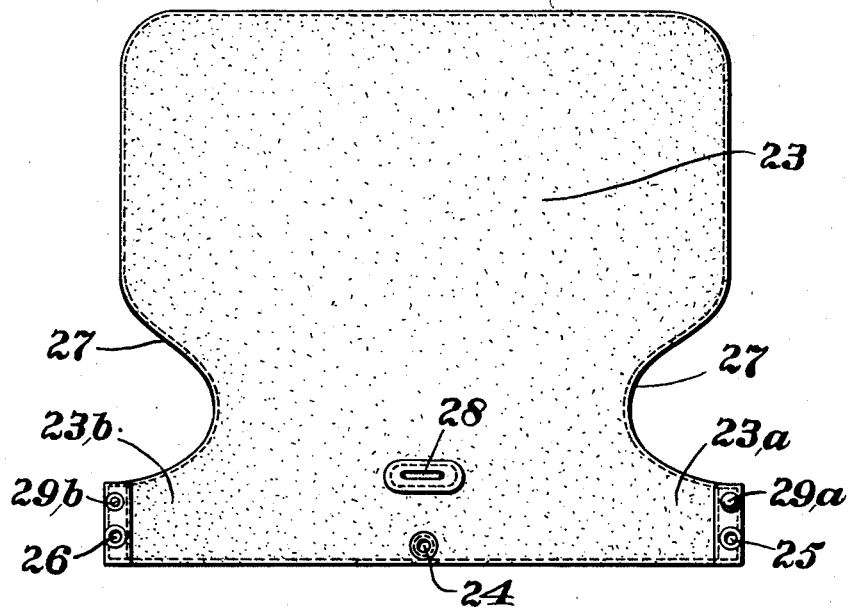
Fig.12a.
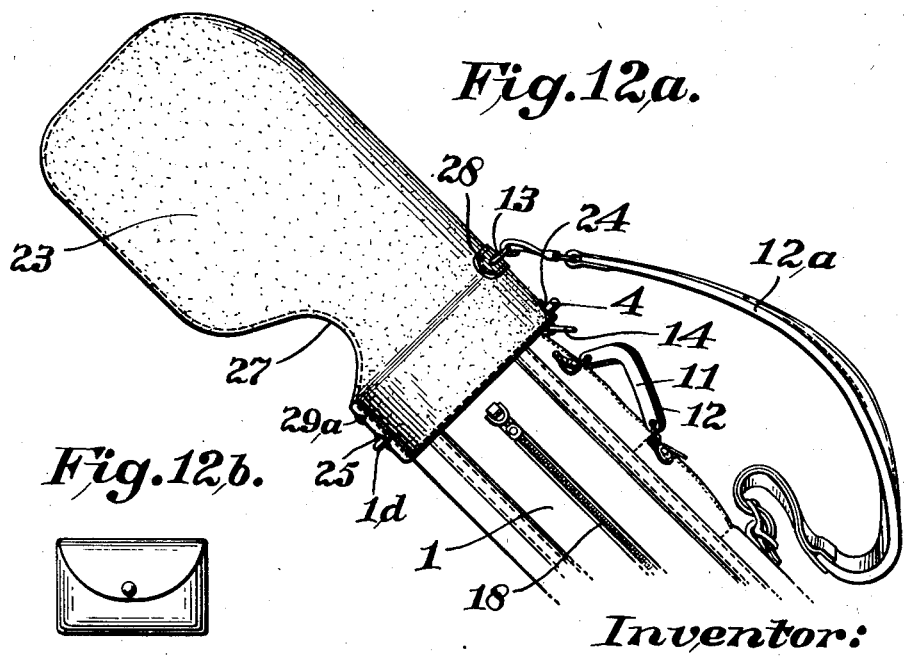
Fig.12b.
Inventor:
Milton B. Reach,
By Spear, Donaldson + Hall
Attys.

Patented Feb. 28, 1933

1,899,825

UNITED STATES PATENT OFFICE

MILTON B. REACH, OF SPRINGFIELD, MASSACHUSETTS, ASSIGNOR TO A. G. SPALDING & BROS., OF NEW YORK, N. Y., A CORPORATION OF NEW JERSEY

GOLF BAG

Application filed April 24, 1931. Serial No. 532,596.

My present invention relates to improvements in golf bags particularly adapted to meet the requirements of the golf player in playing under all sorts of weather conditions and in traveling with golf clubs, golf clothes, and other playing equipment.

An object of the invention is to provide improved accessibility to storage space and the provision and utilization of available space to fully serve the needs of the player conveniently and efficiently, without rendering the bag unwieldy.

A further object is the provision of a golf bag composed of parts with the part or parts useful for traveling readily removable from the part or parts essential for playing.

Other objects will appear hereinafter.

To this end, the invention provides the features, combination, and arrangement of parts hereinafter described and particularly pointed out in the claims.

In the drawings,

Figure 1 is a side elevation of the bag in completely assembled form for traveling.

Fig. 2 is a rear view from the left of Fig. 1.

Fig. 3 is a front view from the right of Fig. 1 with shoulder strap removed.

Fig. 4 is an enlarged vertical sectional view of the club receiving part of the bag, the clothes pouch and hood being detached.

Fig. 4a is an enlarged view of the patch pocket construction within the club receptacle.

Fig. 5 is an enlarged transverse section on line 5—5 of Fig. 1.

Fig. 5a is a sectional detail of the juncture of the upper ends of the two portions of the bag and the cover sheet.

Fig. 6 is an enlarged section on line 6—6 of Fig. 1.

Fig. 7 is a similar section on line 7—7 of Fig. 1.

Fig. 8 is a sectional view of the detachable clothes pocket part of the bag, with parts broken away.

Fig. 9 is a plan view of the top of the club receptacle portion.

Fig. 10 is a view of the heel-skid and pouch supporting bracket.

Fig. 12 is a view of the supplementary water-proof hood.

Fig. 12a shows the supplementary hood applied to the club receptacle portion of the bag, the cover being extended upwardly to clearly show its shape, it being understood that it is limp and will collapse in covering position over the clubs in the bag.

Fig. 12b is a view of the envelope to receive the folded hood to be carried in upper pocket 6a.

Figure 11:
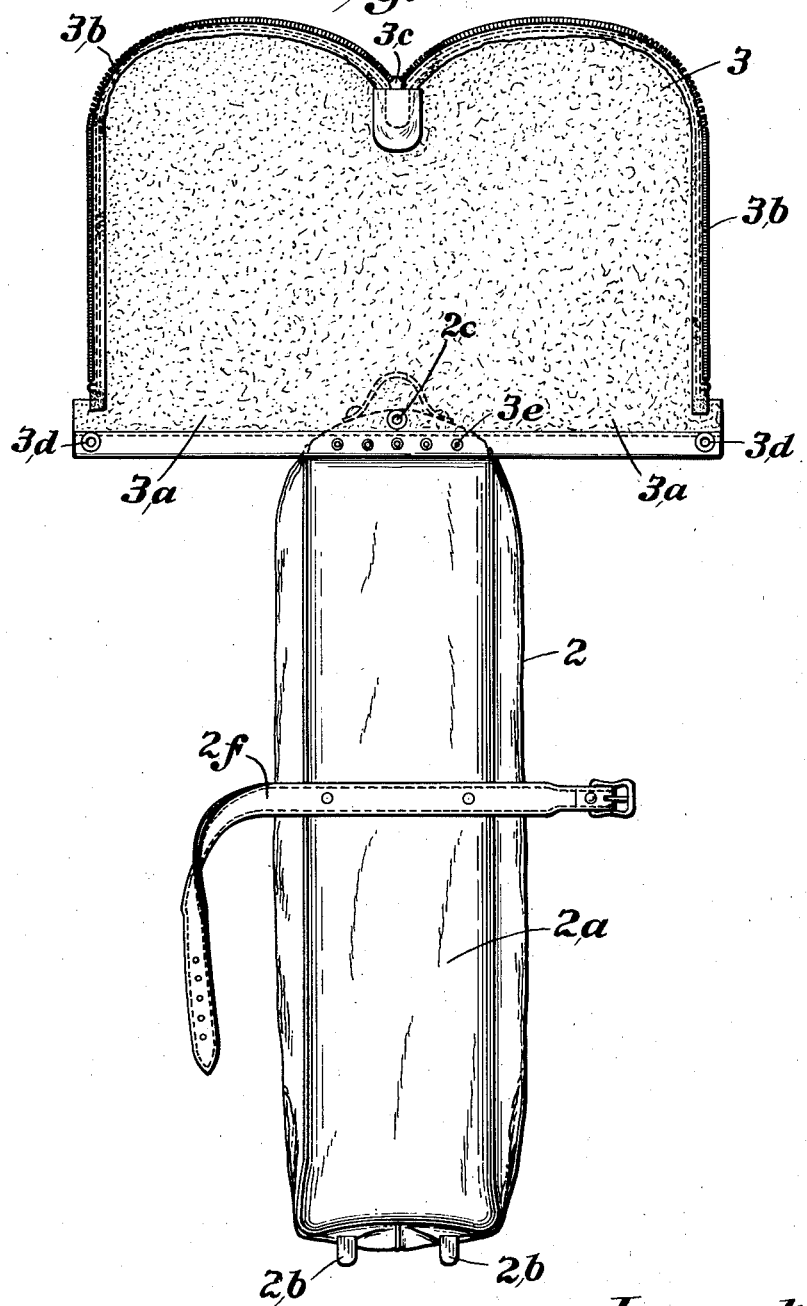
Fig. 11 is a view of the tog pouch portion with the extension sheet member spread out in open position.

Referring to the drawings, 1 represents the golf club receiving portion of the golf bag embodying the invention, and 2 is the removable pocket or pouch portion particularly adapted for carrying articles necessary to the golfer such as golf togs up to the point where he removes it, hangs it up in his locker, and carries the part 1 only in playing the game.

A feature of the invention is the provision of a readily applied and removed clothes pouch portion 2 having an extension of flexible sheet material 3 at its upper end having laterally extending parts 3a to embrace the upper end of the portion 1 of the golf bag, with fastening means at the front of the bag, and so shaped that the upper edges 3b of the sheet 3 may be brought together to effect a complete closure of the upper end of the club receiving portion 1 of the bag. The fastening means preferably comprises a hookless fastener 3c, the upper and side edges 3b of the sheet being correspondingly equipped. The laterally extending parts 3a are provided with eyes 3d adapted to be received upon a pin 4 at the front of the club receiving portion 1 of the bag.

The pocket or pouch portion 2 with its extension sheet member 3 extends along and with its inner wall 2a against the rear wall of the club receiving portion 1 of the golf bag. The pocket portion 2 is shown as being substantially coextensive with the portion 1, but it is not desired to limit the invention in this respect as it will be apparent that the pocket portion 2 may be of less or greater extent than the portion 1.

In the embodiment shown, in addition to the fastening provided by the cover sheet member 3 embracing the portion 1 of the bag, other fastening means are provided to secure the pocket portion 2 of the portion 1. At its lower end, the pocket portion 2 is provided with projection means 2b, to cooperate with corresponding sockets 1b provided by bracket 1c secured to the heel of the bag at the lower rear edge thereof. At its upper end, the sheet extension 3 of the pocket portion 2 is provided with an opening such as eye 2c to cooperate with a projection 1d at the rear of portion 1. Instead of a pin and grommet or eye connection as shown, it will be apparent that a snap button connection may be employed at this point, although the construction shown in Fig. 5a is preferred.

The projections 2b at the lower end of pocket portion 2 comprise extensions of a metal frame 5 providing a substantially flat reinforced inner wall 2a for the portion 2. The frame, shown best in Fig. 8 comprises preferably flat metal strips joined by riveting as shown, there being a pair of longitudinal side members 5a, end cross members 5b, and intermediate cross member 5c. Longitudinal members 5d disposed within and adjacent the side members 5a, are secured at their upper ends to intermediate cross member 5c and at their lower ends to lower end cross member 5b, and are extended below the cross member 5b to provide the projections 2b, which are preferably bent at 5e to provide shoulders to engage the bracket 1c to limit downward movement of the frame 5 and pocket 2.

The bracket or heel-skid or drag piece 1c comprises a piece of sheet metal curved to conform to the bottom rim of the bag portion 1, and provided with apertures 1e to receive fastening means such as rivets 1f. The bracket 1c is bent outwardly into U-shape to form vertical sockets 1b to receive projections 2b to securely hold the lower ends of the portions 1 and 2 together. A depending portion 1g of the bracket is bent inwardly and upwardly in U-shape to embrace the bottom rim of the bag portion 1.

The frame 5 lies against the inner wall 2a of the pocket portion 2 and provides a substantially flat reinforced wall for engagement with the rear wall of the portion 1, and to enable clothes or golf togs to be laid in flat, laundered condition, strap means 2d being provided to hold the contents against the flat stiffened wall 2a.

A flat stiff sheet 5f of fibre material is preferably provided overlying the frame 5 and may be secured to the inner wall 2a directly without connection to the interposed frame as by being sewed through its overlapping marginal edges and thus holding the frame in place, or, as shown, rivets 3e may be applied through the fibre 5f, the frame 5, and the wall 2a.

The pocket portion 2 is provided in its outer wall at 2e with an opening or slit closed with a hookless fastener. A center strap 2f to embrace the club receptacle portion 1 is preferably provided, secured to the inner wall 2a.

The cover or hook sheet member 3 constituting an extension of the inner wall 2a of the pocket portion, may be made in one piece therewith or may be secured to the top thereof as by rivets 3e as shown in Figs. 5, 5a, 8 and 11.

The golf bag of the present invention also provides improved handle means designed to enable the full use of available space at the front of the bag for the provision of storage means.

A patch 6 of leather or similar flexible material is sewed to the inside of the front wall 8 of the club receptacle portion 1 as shown in Fig. 4a, opposite the handle means. Preferably upper and lower patch potches 6a and 6b are provided by the patch 6 being sewed to the front wall at transverse line 6c, the lower pocket being of substantial depth by the bellying out of the patch 6 as shown at 6d.

The front wall 8 of the club receptacle 1 is provided with openings 9, 10, in the form of slits provided with hookless fastener means 9a and 10a. The handle means comprises cooperating handles 11 and 12 secured to the front wall 8 on either side of the slits 9 and 10 and being flexibly mounted to be readily spread apart to provide ready access to the openings 9 and 10 of pockets 6a and 6b.

In one of the pockets 6a or 6b, preferably the upper pocket for ready access, it is intended to carry in folded condition, and preferably in a small envelope, a cover member 23 of very light water-proof material to take the place of the cover member 3, for ready application to the club receptacle in playing in falling weather, the pouch 2 and leather cover 3 having been removed.

The cover member or supplemental hood 23 is shown in Fig. 12 and its manner of application to the club receptacle portion 1 of the bag is shown in Fig. 12a.

The same studs 1d and 4 at the rear and front of the bag are employed to secure the supplemental cover in place on the receptacle portion 1.

The supplemental hood 23 is applied in a reversed manner to that in which the cover 3 is applied, the center eyelet 24 of the hook 23 being applied to the front stud 4, and its lateral portions 23a, 23b, embrace the bag and the end eyelets or grommets 25 and 26 engage the rear stud 1d.

The supplemental hood is of such shape and is extended upwardly to an extent such that it will overhang and completely protect the club receptacle and the clubs therein, as shown in Fig. 12a.

The hook 23 is cut back at the lower parts of its side edges as at 27 to provide for ready access to the club receptacle and to cause the hood to tend to fold over the bag in the direction of the opening provided by the cut away portions.

A slot 28 is provided above the center grommet 24 for the passage of the upper strap ring 13. A snap connection 29a, 29b is also preferably provided for the embracing ends of the hood.

Fig. 12b shows the supplemental hood envelope to receive the light weight hood in folded condition and to be received in patch pocket 6a.

For the sake of clearness, the hood in Fig. 12a is shown extended upwardly in an erect position, it being understood that it is of limp material and will fall or collapse over the clubs in the receptacle, and is readily thrown back providing convenient access to the clubs through opening 27.

The entire bag is preferably constructed of leather although other materials in imitation or substitution of leather may be employed as in golf bags as at present manufactured.

A shoulder carrying strap 12a is provided and upper connecting rings are provided on the bag 1 at 13 and 14, for selective connection therewith.

Further pouch or pocket means are provided on the front wall 8 of the bag at 15, provided with longitudinal opening 16 and equipped with a hookless fastener. Within pouch 15 is provided an inner pocket 17 for balls or other small articles secured to wall 8 and having its opening 17a directly in line with the opening 16 so that it is readily accessible immediately upon the opening of pouch 15.

The club receptacle 1 is preferably provided with a longitudinal hookless fastener opening 18 in its wall, to insert clothing or other articles into the club receptacle.

A hook or handle 19 is provided at the top of the pocket portion 2 to enable it to be readily hung up in the golfer's locker after removal from the portion 1.

A side pouch 20 is shown as being a desirable element contributing with the other features described to provide a golf bag completely filling the golfer's various requirements. A strap 21 is shown in Fig. 9 to serve to divide the clubs. The vertical reinforcements or supports for the club receptacle 1 are disposed along the bag wall and are covered by strips of leather 22.

While the flat inner wall 2a of the pocket portion 2 is preferred, it is not desired to limit the invention in this respect, as the reinforced wall 2a may be concaved to conform to the club receptacle portion 1. Also the covering material for the frame 5 may be made flexible instead of stiff, and the side walls of the pocket portion 2 may be made stiff if desired.

I claim:

1. In combination in a golf bag, a golf club receiving portion, a portion providing a pocket and detachably secured to said first named portion, a cover for the first named portion, said cover being secured to said pocket portion and removable therewith as a unit from said first named portion.

2. In combination in a golf bag, a portion including a golf club receptacle, and a detachable portion providing a pocket and providing a cover for the golf club receptacle and removable as a unit from said first named portion.

3. In combination in a golf bag, a portion to receive golf clubs and a portion providing a pocket and detachably secured to said first named portion and removable as a unit therefrom, said pocket portion including a reinforcing frame within the pocket against the inner wall and extending throughout the length thereof, said frame providing a downwardly disposed frame extension projecting below the lower end of said pocket portion, and said first named portion providing a socket to receive said downward projection, and means for fastening the upper parts of said pocket portion to said first named portion.

4. A golf bag according to claim 3 in which said downwardly projecting frame extension passes through said pocket portion from the inside to the outside thereof, and is provided with a shoulder to limit downward movement thereof in said socket, said socket being provided by a bracket member secured to the wall of the first named portion of the golf bag.

5. A golf bag according to claim 3 in which said frame is of flat metal secured to the wall of the pocket portion which is in detachable engagement with the wall of the first named portion.

6. A golf bag according to claim 3 in which said fastening means includes a fastener providing an opening adjacent the upper end of the pocket portion and a cooperating projection on the first named portion, and a strap secured to said pocket portion and adapted to embrace said first named portion.

7. A golf bag according to claim 3 in which said socket is provided by a bracket member secured to the rear wall of the first named portion of the golf bag, and the reinforced wall of said pocket portion engaging the said rear wall, said pocket portion comprising a bag of flexible leather and said reinforced wall being formed by said frame being of flat sheet metal and a flat sheet of stiff fibre material overlying said flat metal frame and secured to said flexible leather wall.

8. A golf bag according to claim 3 in which said socket is provided by a bracket member secured to the rear wall of the first named portion of the golf bag, and the reinforced wall of said pocket portion engaging the said rear wall, said pocket portion comprising a bag of flexible leather and said reinforced wall being formed by said frame being of flat sheet metal and a flat sheet of stiff fibre material overlying said flat metal frame and secured to said flexible leather wall, said pocket portion being substantially coextensive with said first named portion and being provided with a handle or hanger at its upper end enabling it to be readily handled in removal and to be readily hung in the golfer's locker.

9. A golf bag according to claim 3 in which said fastening means includes a fastener providing an opening adjacent the upper end of the pocket portion and a cooperating projection on the first named portion, and a cover for said first named portion, said cover being secured to the upper end of said reinforced wall of the pocket portion and removable as a unit therewith from said first named portion, said cover including laterally extending parts to embrace and enclose the upper end of said first named portion.

10. A golf bag according to claim 3 in which said fastening means includes a fastener providing an opening adjacent the upper end of the pocket portion and a cooperating projection on the first named portion, and a cover for said first named portion, said cover being secured to the upper end of said reinforced wall of the pocket portion and removable as a unit therewith from said first named portion, said cover including laterally extending parts to embrace and enclose the upper end of said first named portion, said cover being formed in one piece of flexible material and being provided with a hookless fastener to secure the adjoining edges thereof together when in position with the said lateral parts embracing the first named portion of the golf bag.

11. A golf bag according to claim 1 in which said cover is formed in one-piece of flexible material, said cover being of a width at its bottom no less than the circumference of the upper end of the golf club receiving portion and its lateral parts being adapted to embrace the said upper end, and hookless fastener means to secure together the adjoining edges of the one-piece cover when in covering position.

12. A golf bag according to claim 1 in which said cover is joined to the upper end of said pocket portion, and means for fastening said pocket portion with the attached cover for said first named portion, to said first named portion, said fastening means including detachable interengaging members on the first named portion and the pocket portion adjacent the top and bottom of the pocket portion.

13. A golf bag according to claim 1 in which said cover is provided with laterally extending parts to embrace the upper end of said first named portion, said laterally extending parts having means at the ends to cooperate in fastening engagement at the opposite side of the first named portion, means to completely close said cover, and means for fastening said pocket portion with the attached cover to said first named portion, said fastening means including detachable interengageable members on the first named portion and the pocket portion adjacent the top and bottom of the pocket portion.

14. A golf bag according to claim 1 in which said cover has lateral parts provided at the ends with eyes, and a pin on the club receiving portion to receive said eyes in fastening engagement.

15. In combination in a golf bag, a patch pocket formed at the inside of the front wall of the bag, said front wall of the bag having a longitudinal slit providing an opening to said patch pocket, fastening means for joining the edges of the opening in the front wall of the bag, and a pair of cooperating handle members mounted on said wall at either side of said opening.

16. A golf bag according to claim 15 in which a pair of adjacent patch pockets are provided one above the other, and adjoining at said double handle, the front wall of said bag being provided with upper and lower aligned slits providing openings to said upper and lower patch pockets respectively, and hookless fastener means for joining the edges of each of said slits.

17. A golf bag according to claim 3 in which said socket is provided by a bracket member secured to the wall of the first named portion of the golf bag adjacent the heel thereof, said bracket comprising a piece of sheet metal having openings therein to receive fastening means and having a portion bent laterally into U-shape to provide a vertically facing socket to receive said downward portion, said bracket also having a depending portion bent inwardly and upwardly into U-shape and embracing the heel of the bag to provide a heel-skid.

18. A golf bag according to claim 3 in which said frame comprises spaced longitudinal side members of metal and spaced transverse end members of metal joining said longitudinal side strips, an intermediate transverse member, and a pair of longitudinal metal members secured at one end to the intermediate transverse member and at the other end to the lower end transverse member, said pair of longitudinal members being disposed inwardly of the longitudinal side members, said pair of longitudinal members each having an extension below the lower end cross member providing a pair of spaced downwardly disposed projections, and a bracket secured to the wall of said first named portion and comprising a piece of sheet metal bent laterally outwardly to U-shape to provide vertically disposed sockets to receive said frame projections, said bracket having a depending portion bent inwardly and upwardly into U-shape and embracing the heel of the bag to provide a heel-skid.

19. In combination in a golf bag, a portion to receive golf clubs and a portion providing a pocket and detachably secured to said first named portion and removable as a unit therefrom, said pocket portion including a reinforcing frame within the pocket against the inner wall and extending throughout the length thereof, said frame providing a downwardly disposed frame extension projecting below the lower end of said pocket portion, and said first named portion providing a socket to receive said downward projection, said frame comprising spaced longitudinal side members of metal and spaced transverse end members of metal joining said longitudinal side strips, an intermediate transverse member, and a pair of longitudinal members secured at one end to the intermediate transverse member and at the other end to a lower end transverse member, said pair of longitudinal members being disposed inwardly of the longitudinal side members, said pair of longitudinal members each having an extension below the lower end cross member providing a pair of spaced downwardly disposed projections, a bracket secured to the wall of said first named portion and comprising a piece of sheet metal bent laterally into U-shape to provide a vertically disposed socket to receive said frame projections, said bracket having a depending portion bent inwardly and upwardly into U-shape and embracing the heel of the bag to provide a heel-skid, said frame projections being bent to provide a shoulder to engage the bracket and limit entrance of the projections into said sockets, and means for fastening the upper parts of said pocket portion to said first named portion.

20. In combination in a golf bag, a substantially cylindrical golf club receiving portion having handle and carrying means at the front thereof, a heel-skid bracket at the rear bottom edge thereof, said bracket providing a vertically disposed socket, a portion providing a pocket and being substantially coextensive with said first named portion and extending along and against the rear side thereof, said pocket portion having a downward projection to engage said socket, and said pocket portion having at the top thereof an extension sheet of flexible material with laterally extending flexible parts embracing the upper end of said first named portion and secured together at the front thereof, the upper edges of said flexible parts being so shaped that they may be brought together to form a closure for the upper end of the first named portion, and fastening means for effecting said closure.

21. In combination in a golf bag, a golf club receiving portion having handle and carrying means at the front thereof, a bracket secured to the rear side thereof, said bracket providing a vertically disposed socket, a portion providing a pocket and having a downward projection to engage said socket, said pocket portion extending along and against the rear side of said first named portion, said pocket portion having at the top thereof an extension sheet of flexible material with laterally extending flexible parts embracing the upper end of said first named portion and secured together at the front thereof.

22. A golf bag according to claim 21 in which the upper edges of said flexible laterally extending parts of the extension sheet are so shaped that they may be brought together to form a complete closure for the upper end of the first named portion, and fastening means for effecting said closure.

23. A golf bag according to claim 21 in which said laterally extending parts of the extension sheet are provided with eyes, and a stud at the front of the first named portion to receive said eyes in fastening engagement.

24. A golf bag according to claim 21 in which the inner wall of said pocket portion engaging the rear side of said first named portion, is reinforced in substantially flat condition and said flexible sheet is secured at its lower edge to the top of said reinforced flat wall of the pocket portion.

25. A golf bag according to claim 20, in which a pin is provided in the front of said first named portion immediately above the handle means, said laterally extending parts of the extension sheet having eyes to engage said pin, a pocket within the front wall of said first named portion in back of said handle means, an opening in the said front wall, and cooperating handle members on either side of said opening providing for access to said pocket.

26. A golf bag according to claim 20 in which a closable pouch is provided on the outside of the front of said first named portion having a slit with adjoining edges closed by a hookless fastener, and an inner pocket for smaller articles within the said pouch and on its rear wall, said inner pocket having a slit with adjoining edges closed by a hookless fastener, and in alignment or registry with said first mentioned slit to provide for ready access.

27. A golf bag according to claim 1 in which said pocket portion is detachably secured in a locking engagement to said first named portion.

28. A golf bag according to claim 2 in which said pocket portion is detachably secured in a locking engagement to said first named portion.

29. In combination in a golf bag a portion to receive golf clubs and a portion providing a clothes carrying pocket detachably secured to said first named portion and in a locking engagement therewith and removable as a unit therefrom, said pocket portion having a metallic reinforcing frame, anchorage means associated with the club receiving portion, and means associated with said frame to detachably connect the frame with said anchorage means, said clothes pocket being provided with a hood to cover the club receiving portion.

30. In combination in a golf bag according to claim 2, a supplementary water-proof apron or hood of relatively light material with holding means associated therewith, to engage other holding means associated with the said golf club receptacle, said other holding means being common to said hood and to said cover.

31. In combination in a golf bag according to claim 1, said golf club receptacle having projections providing cover holding means at its top at the front and rear, said cover having cooperating holding means adjacent the ends and center of its lower edge to receive said projections, and a supplementary waterproof lightweight cover carried by the bag and provided with holding means at the ends and center of its lower edge to receive said projections, said holding projections being common to the two covers for interchangeable use.

32. In combination in a golf bag, a portion to receive golf clubs, a portion providing a pocket, means detachably securing the lower end of said pocket portion to the club portion below the upper end of the latter, and means carried by the upper end of said pocket portion and removably embracing the upper end of said club portion to detachably secure the upper end of said pocket portion to said club portion, said pocket portion having flexible side and front walls and a non-collapsible rear wall, both of said attaching means being carried by said non-collapsible wall.

In testimony whereof, I affix my signature.

MILTON B. REACH.